United States Patent
Huang et al.

(10) Patent No.: US 9,170,681 B2
(45) Date of Patent: Oct. 27, 2015

(54) NOISE REDUCTION METHOD AND SYSTEM OF CAPACITIVE MULTI-TOUCH PANEL

(71) Applicant: ORISE TECHNOLOGY CO., LTD., Hsinchu (TW)

(72) Inventors: Hsin-Mao Huang, Hsinchu (TW); Chih-Hung Kung, Miaoli County (TW); Hsin-Hao Wang, Tainan (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 73 days.

(21) Appl. No.: 14/066,723

(22) Filed: Oct. 30, 2013

(65) Prior Publication Data
US 2014/0132556 A1 May 15, 2014

(30) Foreign Application Priority Data
Nov. 9, 2012 (TW) ............................... 101141779 A

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ....... G06F 3/041; G06F 3/044; G06F 3/0418; G06F 2201/00
See application file for complete search history.

(56) References Cited

U.S. PATENT DOCUMENTS

| | | | |
|---|---|---|---|
| 7,643,011 B2* | 1/2010 | O'Connor et al. ............. | 345/173 |
| 8,179,408 B2* | 5/2012 | Chen et al. ..................... | 347/174 |
| 8,519,960 B2* | 8/2013 | Chu et al. ....................... | 345/168 |
| 8,970,527 B2* | 3/2015 | Huang et al. ................... | 345/173 |
| 2009/0058818 A1* | 3/2009 | Chang et al. ................... | 345/173 |
| 2010/0060608 A1 | 3/2010 | Yousefpor | |
| 2011/0134076 A1* | 6/2011 | Kida et al. ...................... | 345/174 |
| 2011/0234523 A1* | 9/2011 | Chang et al. ................... | 345/173 |
| 2012/0044199 A1* | 2/2012 | Karpin et al. .................. | 345/174 |
| 2012/0242612 A1* | 9/2012 | Chang ............................ | 345/174 |
| 2012/0268142 A1* | 10/2012 | Kremin et al. ................ | 324/658 |
| 2013/0155007 A1* | 6/2013 | Huang et al. ................... | 345/174 |

* cited by examiner

*Primary Examiner* — Joe H Cheng
(74) *Attorney, Agent, or Firm* — Bacon & Thomas, PLLC

(57) ABSTRACT

A noise reduction system includes a driving device, a sensing device, a first switch, a second switch, and a controller. The driving device has a plurality of drivers for generating touch driving signals. The sensing device has a plurality of sensors for detecting whether there is an external object approached and generating touch sensing signals. The first switch is provided for electrically connecting the plurality of drivers and the plurality of sensors to the capacitive touch panel. The second switch is provided for electrically connecting the plurality of drivers and the plurality of sensors to the capacitive touch panel. The controller configures the first switch and the second switch to perform a first direction driving and second direction sensing, and configuring the first switch and the second switch to perform a second direction driving and first direction sensing.

12 Claims, 9 Drawing Sheets

NOISE REDUCTION METHOD AND SYSTEM OF CAPACITIVE MULTI-TOUCH PANEL

BACKGROUND OF THE INVENTION

1. Field of the Invention

The present invention relates to the technical field of touch panels and, more particularly, to a noise reduction method and system of capacitive multi-touch panel.

2. Description of Related Art

The principle of touch panels is based on different sensing manners to detect a voltage, current, acoustic wave, or infrared to thereby determine the coordinate of a touch point on a screen as touched by a finger or other medium. For example, a resistive touch panel uses a potential difference between the upper and lower electrodes to compute the position of a pressed point for determining the location of the touch point, and a capacitive touch panel uses a capacitance change generated in an electrostatic combination of the arranged transparent electrodes with the touching part of a human body to generate a current or voltage for detecting the coordinate of the touching part.

Upon the principle, the capacitive touch technologies can be divided into a surface capacitive and a projected capacitive sensing. The surface capacitive sensing has a simple configuration, so that the multi-touch implementation is not easy, and the problems of electromagnetic disturbance (EMI) and noises are difficult to be overcome. Therefore, the popular trend of capacitive touch development is toward the projected capacitive sensing.

The projected capacitive sensing can be divided into a self capacitance and a mutual capacitance sensing. The self capacitance sensing indicates that a capacitance coupling is generated between a touch object and a conductor line, and a touch occurrence is decided by measuring a capacitance change of the conductor line. The mutual capacitance sensing indicates that a capacitance coupling is generated between two adjacent conductor lines when a touch occurs.

A typical self capacitance sensing senses the grounded capacitance on every conductor line. Thus, a change of the grounded capacitance is used to determine whether an object is close to the capacitive touch panel. The self capacitance or the grounded capacitance is not a physical capacitor, but parasitic and stray capacitance on every conductor line. FIG. 1 is a schematic view of a typical self capacitance sensing. As shown in FIG. 1, during the first time interval, the driving and sensing devices 110 in a first direction drive the conductor lines in the first direction in order to further charge the self capacitance of the conductor lines in the first direction. During the second period, the driving and sensing devices 110 sense the voltages on the conductor lines in the first direction, thereby obtaining m data. During the third period, the driving and sensing devices 120 in a second direction drive the conductor lines in the second direction in order to further charge the self capacitance of the conductor lines in the second direction. During the fourth period, the driving and sensing devices 120 sense the voltages on the conductor lines in the second direction, thereby obtaining n data. Accordingly, there are m+n data obtained.

The typical self capacitance sensing of FIG. 1 connects both a driver circuit and a sensor circuit on the same conductor line in order to drive the conductor line and sense a signal change on the same conductor line to thereby decide a magnitude of the self capacitance. In this case, the advantages include:

(1) a reduced amount of data since the typical touch panel has m+n data in a single image only, so as to save the hardware cost;

(2) a reduced time required for sensing a touch point since an image raw data can be quickly fetched due to only two sensing operations, i.e., concurrently (or one-by-one) sensing all the conductor lines in the first direction first and then in the second direction, for completing a frame, as well as a relatively reduced time required for converting a sensed signal from analog into digital; and (3) a lower power consumption due to the reduced amount of data to be processed.

However, such a self capacitance sensing also has the disadvantages as follows:

(1) When there is a floating conductor, such as a water drop, an oil stain, and the like, on the touch panel, it causes an error decision on a touch point.

(2) When there are multiple touch points concurrently on the touch panel, it causes a ghost point effect, so that such a self capacitance sensing cannot be used in multi-touch applications.

Another way of driving the typical capacitive touch panel is to sense a magnitude change of mutual capacitance Cm to thereby determine whether an object is close to the touch panel. Likewise, the mutual capacitance Cm is not a physical capacitor but a mutual capacitance between the conductor lines 230 in the first direction and in the second direction. FIG. 2 is a schematic diagram of a typical mutual capacitance sensing. As shown in FIG. 2, the drivers 210 are located on the first direction (Y), and the sensors 220 are located on the second direction (X). On the touch panel, the conductor lines 230 in the first direction, connected to the drivers 210, are also known as driving lines, and the conductor lines 230 in the second direction, connected to the sensors 220, are also known as sensing lines At the upper half of the first time interval T1, the drivers 210 drive the conductor lines 230 in the first direction and use the voltage Vy_1 to charge the mutual capacitance (Cm) 250, and at the lower half, all sensors 220 sense voltages (Vo_1, Vo_2, . . . , Vo_n) on the conductor lines 240 in the second direction to thereby obtain n data. Accordingly, the m*n data can be obtained after m driving periods.

Such a mutual capacitance sensing has the advantages as follows:

(1) It is easily determined whether a touch is generated from a human body since a signal generated from a floating conductor is in a different direction than a grounded conductor.

(2) Every touch point is indicated by a real coordinate, and the real position of each point can be found when multiple points are concurrently touched, so that such a mutual capacitance sensing can easily support the multi-touch applications.

Also, there are some disadvantages as follows:

(1) A single image raw data has an amount of n*m, which is relatively higher than the amount under the self capacitance sensing.

(2) A one-by-one scanning is operated in a selected direction. For example, when there are 20 conductor lines in the first direction (Y), the sensing operation is performed 20 times for obtaining a complete image raw data. Also, due to the large amount of data, the time required for converting a sensed signal from analog into digit is relatively increased.

(3) Due to the large amount of data, the power consumption is thus increased on data processing.

Whether the self or the mutual capacitance operation is used, the obtained touching data is likely to be influenced by noises, so that errors may appear on determining the position when the capacitive touch panel is touched, resulting in that the sensing resolution of the capacitive touch panel is influenced.

To overcome this problem, in the U.S. Pat. No. 7,643,011 granted to O'Connor, et al. for a "Noise detection in multi-touch sensors", three stimulus waves, each having a different driving frequency, are output by a manner of mutual capacitance, so as to responsively obtain three touch images, and one with the minimum noise is selected from the three touch images. Thus, the driving frequency corresponding to the touch image with the minimum noise is selected as the active frequency for extracting the touch image and calculating the coordinate or position.

However, in actual application of the mutual capacitance sensing, when there is a touch on the touch panel, the sensing lines involved in the touch position are changed in signals and also influenced by noises from human body, resulting in that the position that is not touched by finger may be erroneously determined to be a touched position.

FIG. 3 schematically illustrates the noise influence on a prior touch panel. As shown, when a finger touches position A of the touch panel, touch noise generated therefrom influences signals on the sensing lines involved in the touched position. That is, during time period Tx, the drivers drive the driving lines, in which voltage Vy_1 is employed to charge the mutual capacitance (Cm). At this moment, the voltage detected by the sensors includes the voltage generated from the finger touching position A of the touch panel and the voltage of the noise caused by the finger touching position A of the touch panel. Due to that the voltage detected by the sensors includes the voltage generated from the finger touching position A of the touch panel, the capability to resist noises is relatively high at this moment.

During time period Ty, the voltage detected by the sensors 220 includes only the voltage of the noise caused by the finger touching position A of the touch panel. At this moment, due to that the voltage detected by the sensors does not include the voltage generated from the finger touching position A of the touch panel, the touch data obtained at position B is likely to be influenced by noises, so that errors may appear on determining the position when the capacitive touch panel is touched, resulting in that the sensing resolution of the capacitive touch panel is influenced. That is, noises caused by finger touching will be distributed and diffused along the direction of the sensing lines.

Therefore, it is desirable to provide an improved noise reduction method and system of capacitive multi-touch panel to mitigate and/or obviate the aforementioned problems.

SUMMARY OF THE INVENTION

The object of the invention is to provide noise reduction method and system of capacitive multi-touch panel, which can solve the problem in that noises caused by finger touching will be distributed and diffused along the direction of the sensing lines, so as to eliminate the noises and increase the sensing resolution of capacitive touch panel.

In one aspect of the present invention, there is provided a noise reduction system for use in a capacitive touch panel including M first conductor lines and N second conductor lines arranged along a first direction and a second direction, respectively, where M and N are each an integer greater than 1. The noise reduction system comprises: a driving device having a plurality of drivers for generating touch driving signals in touch sensing operation; a sensing device having a plurality of sensors for detecting whether there is an external object approached according to the touch driving signals, and generating touch sensing signals; a first switch connected to the driving device, the sensing device, and the capacitive touch panel for electrically connecting the plurality of drivers of the driving device and the plurality of sensors of the sensing device to the capacitive touch panel; a second switch connected to the driving device, the sensing device, and the capacitive touch panel for electrically connecting the plurality of drivers of the driving device and the plurality of sensors of the sensing device to the capacitive touch panel; and a controller connected to the driving device, the sensing device, the first switch, and the second switch for configuring the first switch and the second switch to perform a first direction driving and second direction sensing, and configuring the first switch and the second switch to perform a second direction driving and first direction sensing.

In another aspect of the invention, there is provided a noise reduction method for use in a capacitive touch panel having M first conductor lines and N second conductor lines arranged along a first direction and a second direction, respectively, where M and N are each an integer greater than 1. The method comprises the steps of: (A) capturing an initialization sensing image data of the capacitive touch panel; (B) during a first time interval, a controller configuring a first switch and a second switch to perform a first direction driving and second direction sensing thereby obtaining a first sensing image data; (C) during a second time interval, the controller configuring the first switch and the second switch to perform a second direction driving and first direction sensing thereby obtaining a second sensing image data; and (D) the controller determining sensing image data of the capacitive touch panel based on the initialization sensing image data, the first sensing image data and the second sensing image data.

Other objects, advantages, and novel features of the invention will become more apparent from the following detailed description when taken in conjunction with the accompanying drawings.

DETAILED DESCRIPTION OF THE PREFERRED EMBODIMENT

Figure 4:
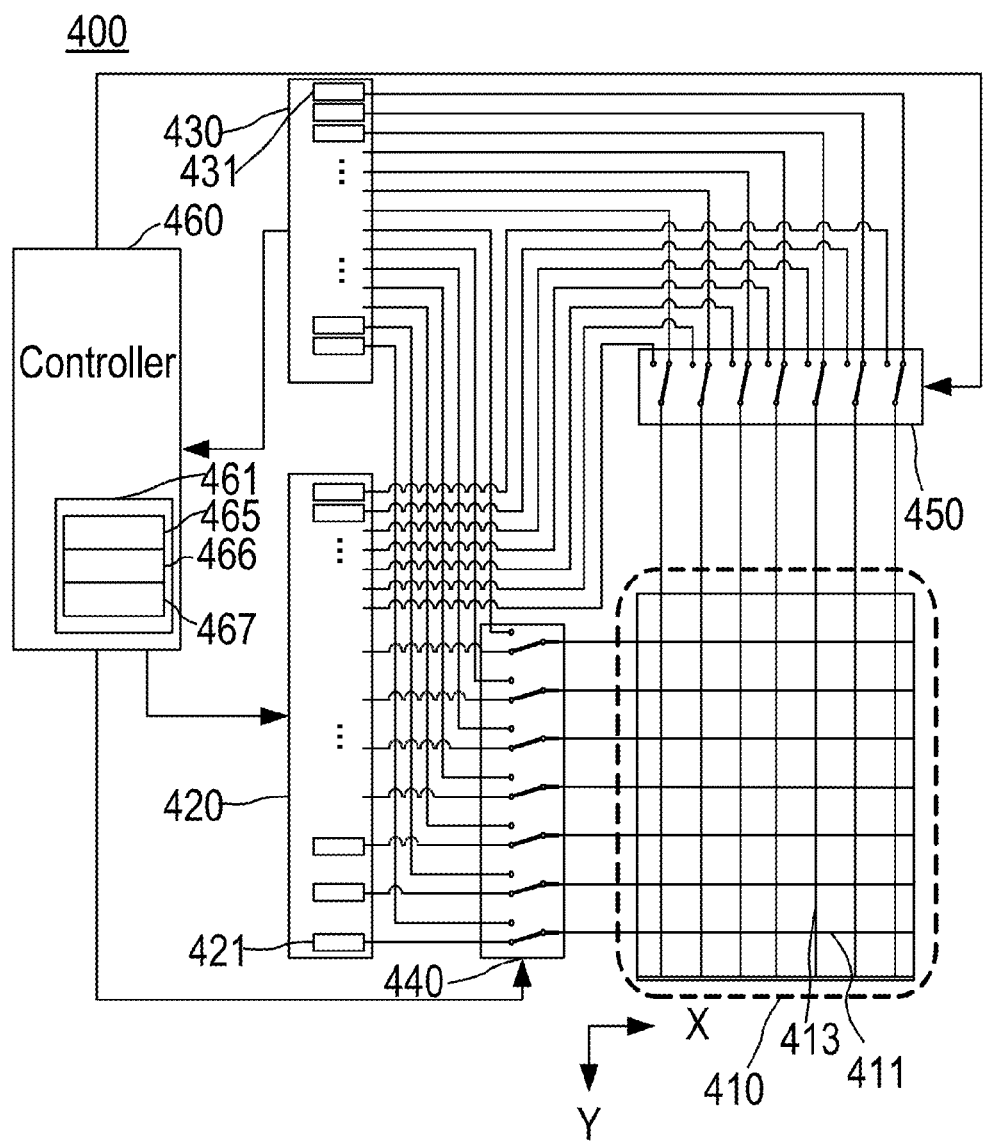
FIG. 4 is a system block diagram of the noise reduction system of capacitive multi-touch panel in accordance with the present invention.

The noise reduction system of capacitive multi-touch panel in accordance with the present invention is used in a capacitive touch panel. FIG. 4 is a system block diagram of the noise reduction system of capacitive multi-touch panel 400. The noise reduction, system of capacitive multi-touch panel 400 includes a capacitive touch panel 410, a driving device 420, a sensing device 430, a first switch 440, a second switch 450 and a controller 460.

The capacitive touch panel 410 has M first conductor lines 411 and N second conductor lines 413, where M and N are each an integer greater than 1. The M first conductor lines and the N second conductor lines are arranged along a first direction (Y direction) and a second direction (X direction) respectively, wherein the first direction is substantially vertical with the second direction.

The driving device 420 has a plurality of drivers 421 for generating touch driving signals in touch sensing operation.

The sensing device 430 has a plurality of sensors 431 for detecting whether there is an external object approached, according to the touch driving signals, and generating touch sensing signals.

The first switch 440 is connected to the driving device 420, the sensing device 430, and the capacitive touch panel 410 for electrically connecting the plurality of drivers 421 of the driving device 420 and the plurality of sensors 431 of the sensing device 430 to the capacitive touch panel 410.

The second switch 450 is connected to the driving device 420, the sensing device 430, and the capacitive touch panel 410 for electrically connecting the plurality of drivers 421 of the driving device 420 and the plurality of sensors 431 of the sensing device 430 to the capacitive touch panel 410.

The controller 460 is connected to the driving device 420, the sensing device 430, the first switch 440, and the second switch 450 for controlling the electrical connection between the plurality of drivers 421 from the driving device 420 and the capacitive touch panel 410 or between the plurality of sensors 431 from the sensing device 430 and the capacitive touch panel 410.

The controller 460 configures the first switch 440 and the second switch 450 for performing a first direction driving and second direction sensing, and a second direction driving and first direction sensing.

Figure 1:
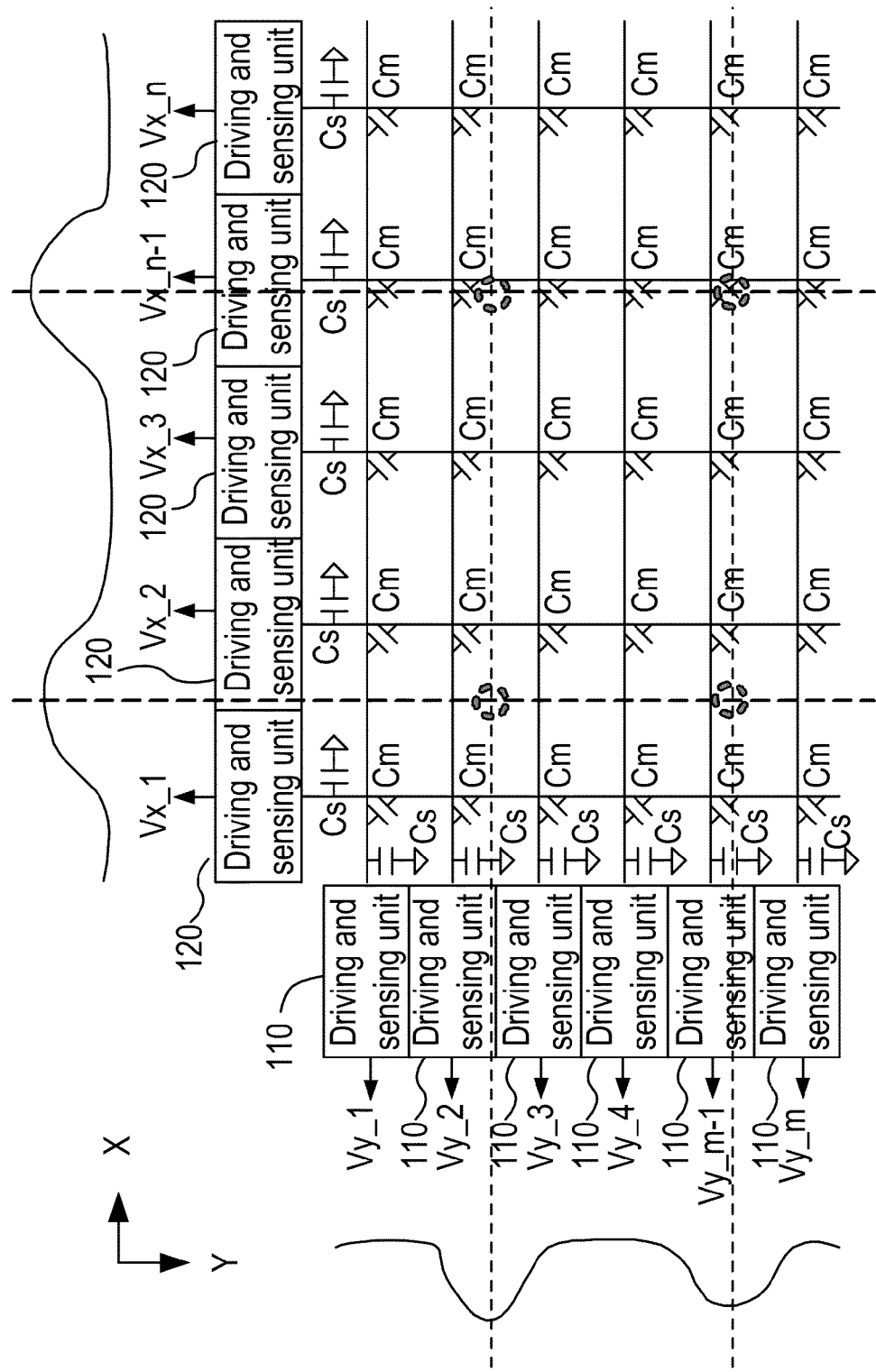
FIG. 1 is a schematic view of a typical self capacitance sensing.
Figure 2:
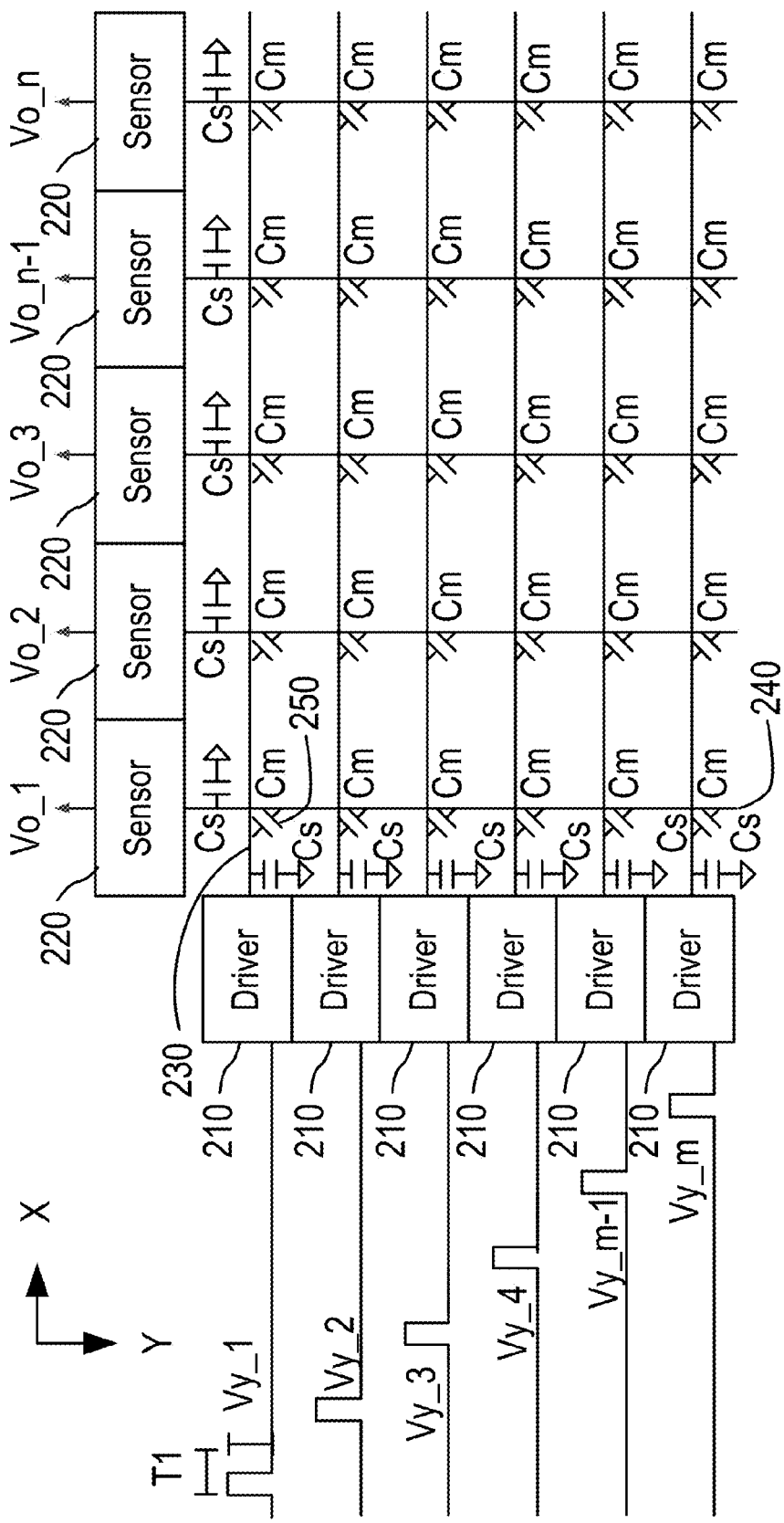
FIG. 2 is a schematic diagram of a typical mutual capacitance sensing.
Figure 3:
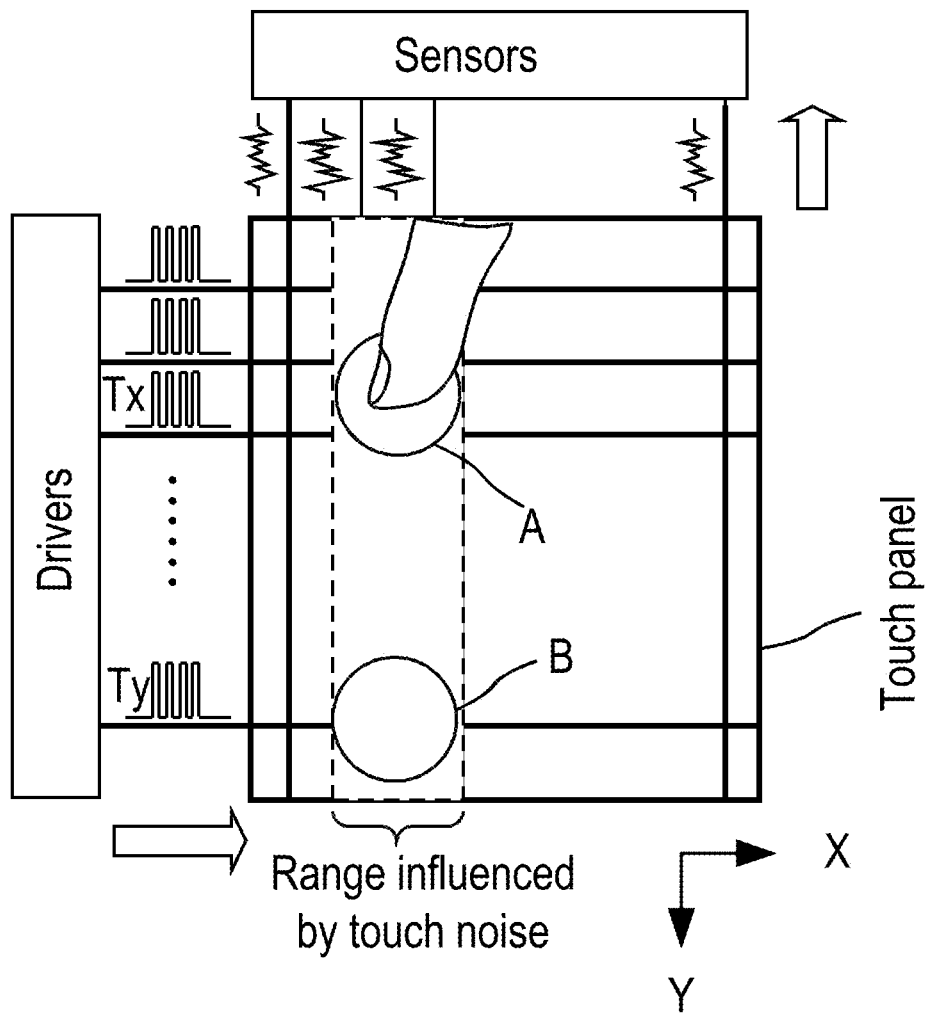
FIG. 3 schematically illustrates the noise influence on a prior touch panel.

For the first direction driving and second direction sensing, also with reference to FIG. 3, the plurality of drivers 421 of the driving device 420 sequentially output driving signals along the first direction (Y direction) and the plurality of sensors 431 of the sensing device 430 simultaneously receive sensing signals along the second direction (X direction). Alternatively, the plurality of sensors 431 of the sensing device 430 may sequentially receive sensing signals along the second direction (X direction).

With reference to FIG. 4, during a first time interval, the controller 460 configures the first switch 440 for electrically connecting the plurality of drivers 421 of the driving device 420 to the M first conductor lines 411 of the capacitive touch panel 410, and configures the second switch 450 for electrically connecting the plurality of sensors 431 of the sensing device 430 to the N second conductor lines 413 of the capacitive touch panel 410, thereby proceeding with the first direction driving and second direction sensing.

Figure 5:
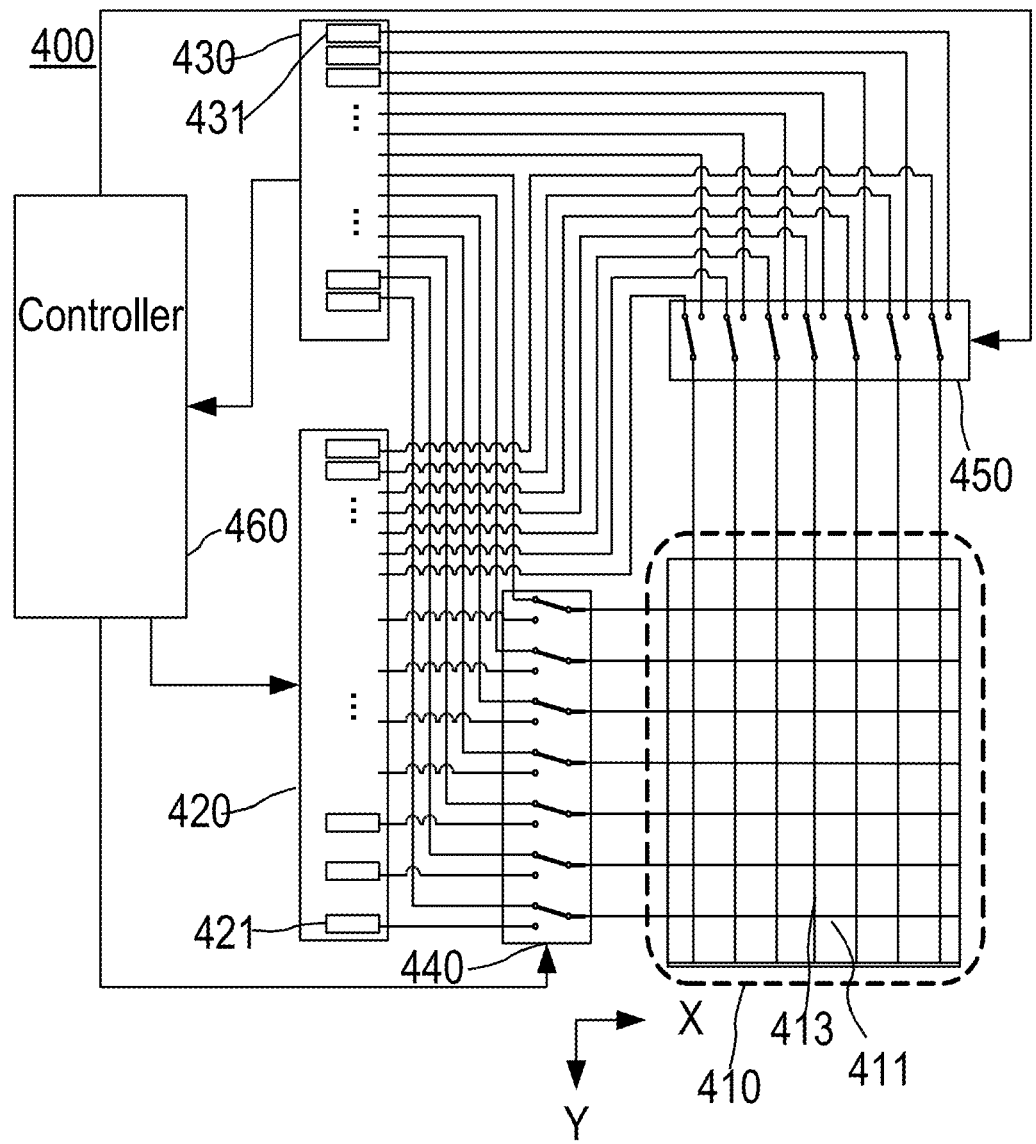
FIG. 5 is schematic diagram illustrating the operation of the noise reduction system of capacitive multi-touch panel.

FIG. 5 is another schematic diagram illustrating the operation of the noise reduction system of capacitive multi-touch panel 400. As shown, during a second time interval, the controller 460 configures the first switch 440 for electrically connecting the plurality of drivers 421 of the driving device 420 to the N second conductor lines 413 of the capacitive touch panel 410, and configures the second switch 450 for electrically connecting the plurality of sensors 431 of the sensing device 430 to the M first conductor lines 411 of the capacitive touch panel 410, thereby proceeding with the second direction driving and first direction sensing.

In the present invention, the first direction driving and second direction sensing, as shown in FIG. 4, is employed first to obtain a first sensing image data in the first time interval. At this moment, in the second time interval, the first switch 440 and the second switch 450 are used to exchange positions of the driving device 420 and the sensing device 450. As shown in FIG. 5, the arrangement thereof is different from that of FIG. 4 in that the sensing circuit of FIG. 4 is switched to become the driving circuit and the driving circuit thereof is switched to become the sensing circuit. That is, the driving device 420, shown in FIG. 4, connected to the M first conductor lines 411 of the capacitive touch panel 410 is connected to the N second conductor lines 413 of the capacitive touch panel 410 in FIG. 5. Also, the sensing device 430, shown in FIG. 4, connected to the N second conductor lines 413 of the capacitive touch panel 410 is connected to the M first conductor lines 411 of the capacitive touch panel 410 in FIG. 5.

Figure 6:
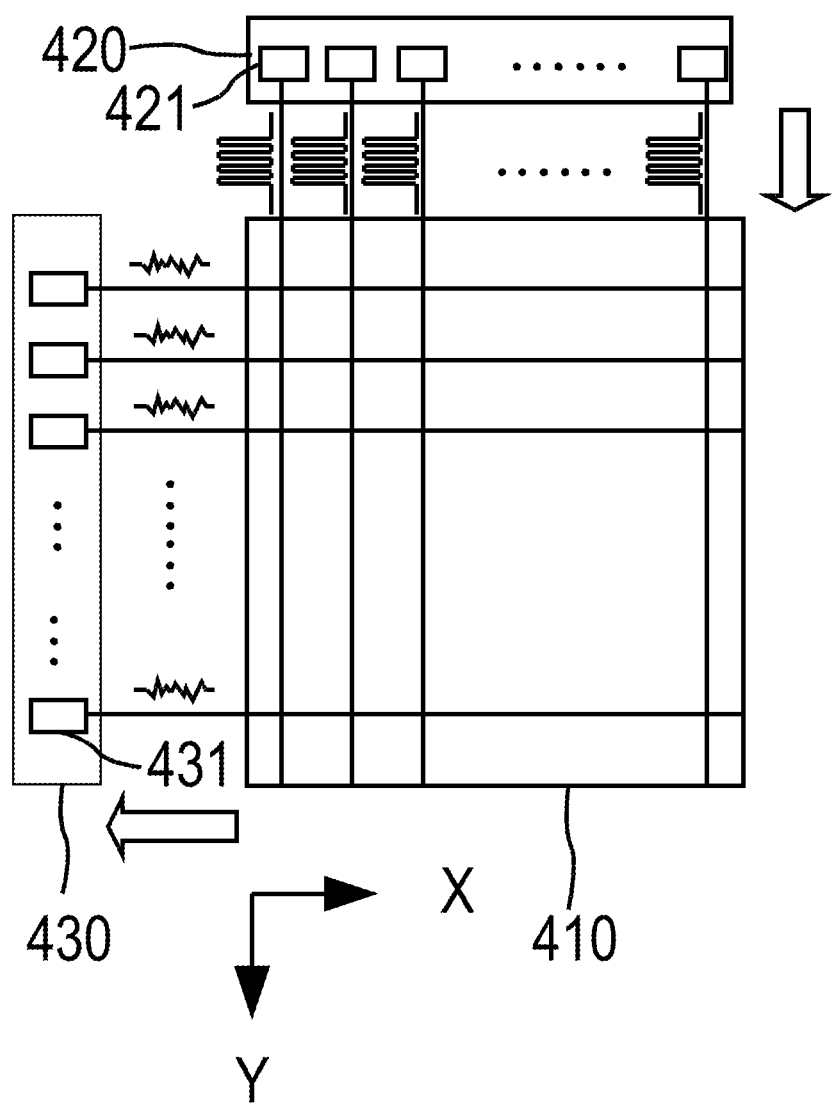
FIG. 6 schematically illustrates the operation of the present invention in the second time interval.

FIG. 6 schematically illustrates the operation of the present invention during the second time interval. Similarly, the driving device 420 generates specific driving signals, which enter the touch panel via the circuit of the capacitive touch panel 410, and the sensing device 430 receives sensing signals and their variations, so that the sensing device 430 can receive the variation of the sensing signals when a finger touches the touch panel.

Figure 7:
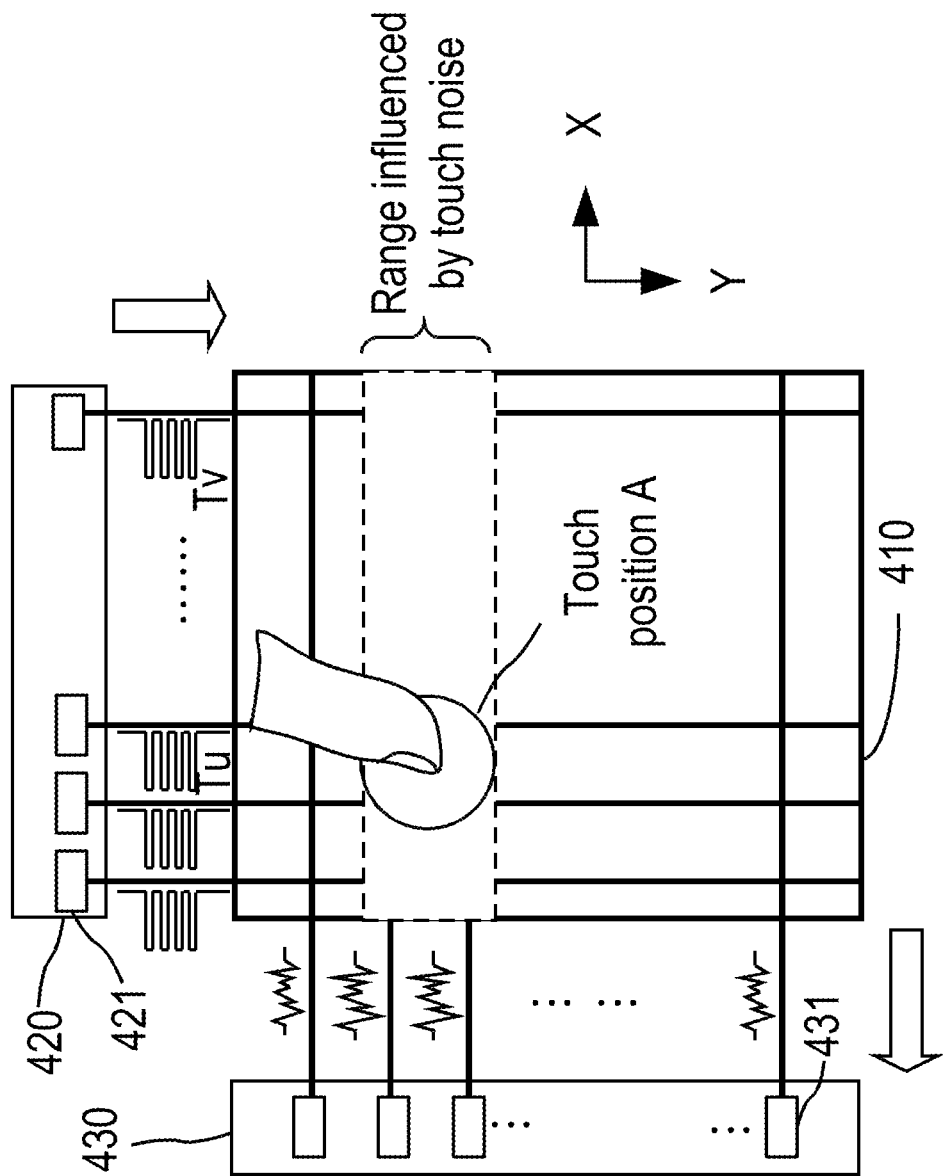
FIG. 7 schematically illustrates noise influence to the operation in the second time interval.

FIG. 7 schematically illustrates noise influence to the operation during the second time interval, which is different from FIG. 3 in that the noise influence from human body in FIG. 3 is along Y direction while the noise influence from human body in FIG. 7 is along X direction, and a second sensing image data is obtained in the second time interval.

For the second direction driving and first direction sensing, with reference to FIG. 7, the plurality of drivers 421 of the driving device 420 sequentially output driving signals along the second direction (X direction) and the plurality of sensors 431 of the sensing device 430 simultaneously receive sensing signals along the first direction (Y direction). Alternatively, the plurality of sensors 431 of the sensing device 430 may sequentially receive sensing signals along the first direction (Y direction).

From FIG. 3 and FIG. 7, it can be seen that the ranges of the noise image caused by touch are different. Therefore, by comparing the first sensing image data with the second sensing image data, it is able to determine the actual touch position.

The controller 460 has a register unit 461. The register unit 461 includes a first storage block 465, a second storage block 466 and a third storage block 467.

The first storage block 465 stores initialization sensing image data when the capacitive touch panel is initialized. The second storage block 466 stores the first sensing image data of the first time interval. The third storage block 467 stores the first sensing image data of the second time interval. Each of the initialization sensing image data, the first sensing image data and the second sensing image data has M×N data.

The controller 460 performs a transpose operation to the data obtained from proceeding with the second direction driving and first direction sensing during the second time interval, so as to obtain the second sensing image data.

Based on the initialization sensing image data, the first sensing image data and the second sensing image data, the controller 460 determines the sensing image data of the capacitive touch panel 410. When the absolute value of difference between one data of the first sensing image data and one data at corresponding position of the initialization sensing image data is smaller than or equal to the absolute value of difference between one data at the corresponding position of the second sensing image data and the data of the initialization sensing image data, the controller 460 configures the sensing image data at corresponding position of the capacitive touch panel as the first sensing image data. When the absolute value of difference between the data of the first sensing image data and the data at the corresponding position of the initialization sensing image data is larger than the absolute value of difference between the data at the corresponding position of the second sensing image data and the data of the initialization sensing image data, the controller 460 configures the sensing image data at corresponding position of the capacitive touch panel as the second sensing image data.

That is, the controller 460 is based on the following equation to determine the sensing image data of the capacitive touch panel 410:

$$\mathrm{Csig\_o}(x, y) = \begin{cases} \mathrm{Csig\_1}(x, y), & \text{when } \|\mathrm{Csig\_1}(x, y) - \mathrm{Csig\_b}(x, y)\| \leq \|\mathrm{Csig\_2}(x, y) - \mathrm{Csig\_b}(x, y)\| \\ \mathrm{Csig\_2}(x, y), & \text{when } \|\mathrm{Csig\_1}(x, y) - \mathrm{Csig\_b}(x, y)\| > \|\mathrm{Csig\_2}(x, y) - \mathrm{Csig\_b}(x, y)\|, \end{cases}$$

where $\mathrm{Csig\_1}(x, y)$ represents one data of the first sensing image data, $\mathrm{Csig\_2}(x, y)$ represents one data of the second sensing image data, $\mathrm{Csig\_b}(x, y)$ represents one data of the initialization sensing image data, and $\mathrm{Csig\_o}(x, y)$ represents the sensing image data of the capacitive touch panel, $0 \leq x \leq M-1$, $0 \leq y \leq N-1$.

Figure 8:
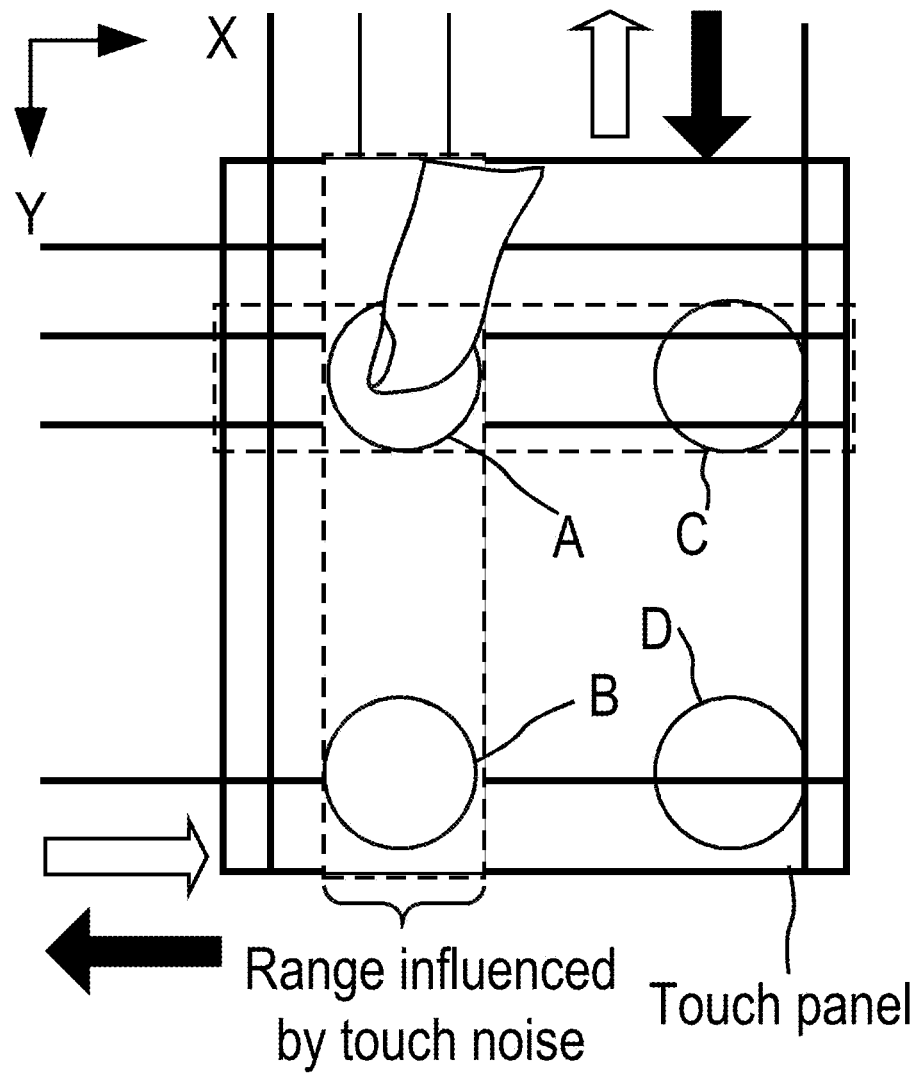
FIG. 8 schematically illustrates how the controller determines the sensing image data of the capacitive touch panel.

FIG. 8 schematically illustrates how the controller 460 determines the sensing image data of the capacitive touch panel 410. During a first time interval, the first direction (Y) driving and second direction (X) sensing is performed so that noise may be distributed along the Y direction and thus B point is likely to be influenced by the noise. During a second time interval, the second direction (X) driving and first direction (Y) sensing is performed so that noise may be distributed along the X direction and thus B point is not influenced by the noise. Similarly, during the first time interval, the first direction (Y) driving and second direction (X) sensing is performed so that noise may be distributed along the Y direction but not the X direction and thus C point is not influenced by the noise; during the second time interval, the second direction (X) driving and first direction (Y) sensing is performed so that noise may be distributed along the X direction and thus C point is likely to be influenced by the noise.

From the above equations, it is known that the process takes the smaller one of the value obtained from subtracting the initialization sensing image data from the first sensing image data and the value obtained from subtracting the initialization sensing image data from the second sensing image data. For example, in FIG. 8, the initialization sensing image data of points A, B, C and D is $$\begin{bmatrix} A & C \\ B & D \end{bmatrix} = \begin{bmatrix} 30 & 30 \\ 30 & 30 \end{bmatrix},$$

the first sensing image data is $$\begin{bmatrix} A & C \\ B & D \end{bmatrix} = \begin{bmatrix} 90 & 40 \\ 79 & 10 \end{bmatrix},$$

and second sensing image data is $$\begin{bmatrix} A & C \\ B & D \end{bmatrix} = \begin{bmatrix} 100 & 89 \\ 20 & 30 \end{bmatrix}.$$

That is, when the first direction (Y) driving and second direction (X) sensing is performed, noise is distributed along the Y direction, so that, point B is influenced by the noise and thus its value is increased from 30 to 79. When the second direction (X) driving and first direction (Y) sensing is performed, noise is distributed along the X direction, so that point B is not influenced by the noise and its value is simply changed from 30 to 20. Similarly, when the first direction (Y) driving and second direction (X) sensing is performed, noise is distributed along the Y direction, so that point C is not influenced by the noise and its value is simply changed from 30 to 40. When the second direction (X) driving and first direction (Y) sensing is performed, noise is distributed along the X direction, so that, although not being touched by a finger, point C is influenced by the noise and thus its value is increased from 30 to 89. From the above equations, the sensing image data of the capacitive touch panel is $$\begin{bmatrix} A & C \\ B & D \end{bmatrix} = \begin{bmatrix} 90 & 40 \\ 20 & 30 \end{bmatrix}.$$

From the sensing image data of the capacitive touch panel, the controller 460 can easily determine that there is a touch at point A. Furthermore, the method of the present invention is able to eliminate the influence of the noise caused by finger touching.

In this embodiment, the values of M and N are each to be 7. However, those skilled in the art may change M and N to other values according to the specification of the present invention, in which the value of M can be different from that of N.

Figure 9:
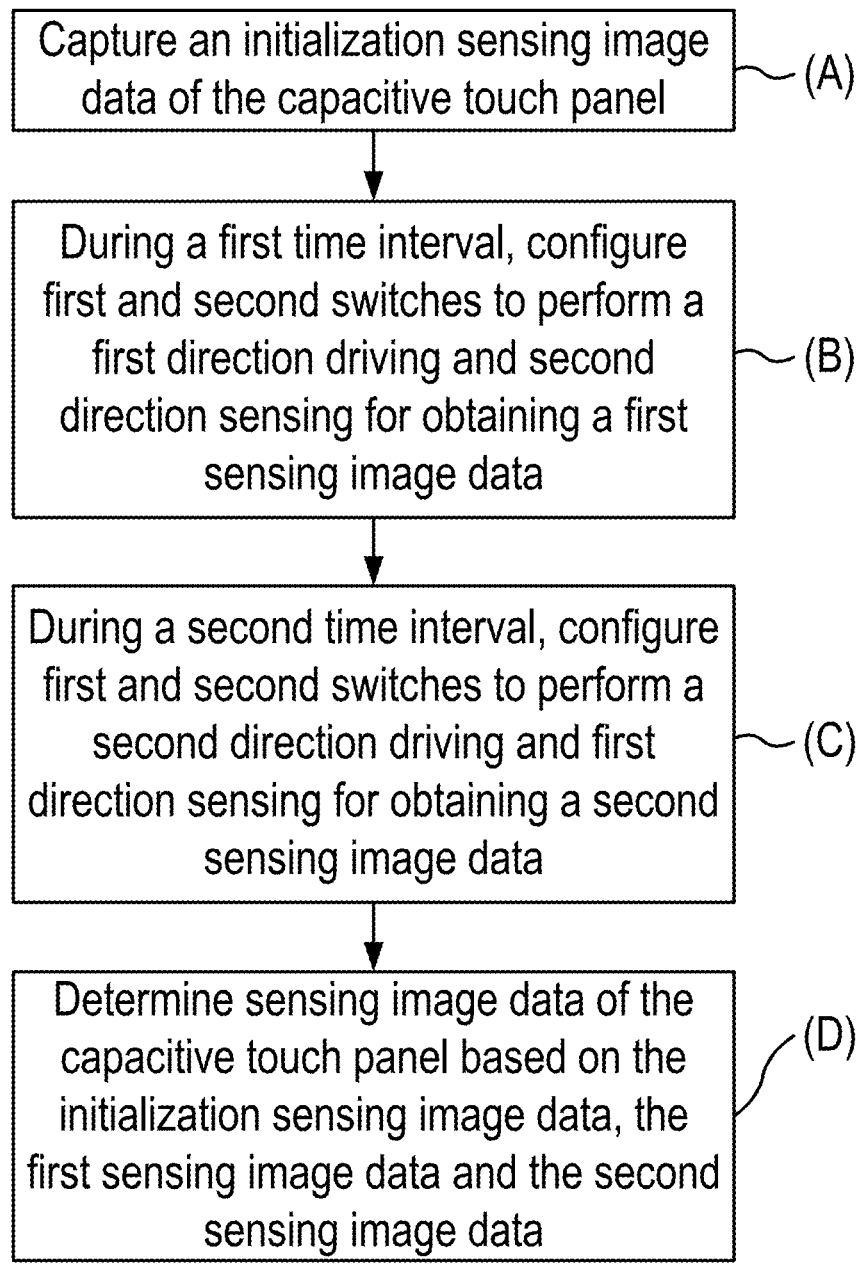
FIG. 9 is a flow chart of the noise reduction method of capacitive multi-touch panel in accordance with the present invention.

FIG. 9 is a flow chart of the noise reduction method of capacitive multi-touch panel in accordance with the present invention, which is used in the aforementioned capacitive touch panel 410. The capacitive touch panel 410 has M first conductor lines 411 and N second conductor lines 413, where M and N are each an integer greater than 1. The M first conductor lines and the N second conductor lines are arranged along a first direction and a second direction, respectively.

In step (A), the noise reduction method first captures an initialization sensing image data of the capacitive touch panel 410.

In step (B), during a first time interval, the controller 460 configures the first switch 440 and the second switch 450 to perform a first direction driving and second direction sensing thereby obtaining a first sensing image data.

Specifically, in step (B), the controller 460 configures the first switch 440 for electrically connecting the plurality of drivers 421 of the driving device 420 to the M first conductor lines 411 of the capacitive touch panel 410, and configures the second switch 450 for electrically connecting the plurality of sensors 431 of the sensing device 430 to the N second conductor lines 413 of the capacitive touch panel 410, so as to perform the first direction driving and second direction sensing.

In step (C), during a second time interval, the controller 460 configures the first switch 440 and the second switch 450 to perform a second direction driving and first direction sensing thereby obtaining a second sensing image data.

Specifically, in step (C), the controller 460 configures the first switch 440 for electrically connecting the plurality of drivers 421 of the driving device 420 to the N second conductor lines 413 of the capacitive touch panel 410, and configures the second switch 450 for electrically connecting the plurality of sensors 431 of the sensing device 430 to the M first conductor lines 411 of the capacitive touch panel 410, so as to perform the second direction driving and first direction sensing, wherein each of the initialization sensing image data, the first sensing image data and the second sensing image data has M×N data.

In step (D), the controller 460 determines the sensing image data of the capacitive touch panel based on the initialization sensing image data, the first sensing image data and the second sensing image data. When the absolute value of the difference between one data of the first sensing image data and one data at corresponding position of the initialization sensing image data is smaller than or equal to the absolute value of the difference between one data at corresponding position of the second sensing image data and the data of the initialization sensing image data, the controller 460 configures the sensing image data at corresponding position of the capacitive touch panel to be the first sensing image data. When the absolute value of the difference between the data of the first sensing image data and the data at corresponding position of the initialization sensing image data is greater than the absolute value of the difference between the data at corresponding position of the second sensing image data and the data of the initialization sensing image data, the controller 460 configures the sensing image data at corresponding position of the capacitive touch panel to be the second sensing image data.

That is, the controller 410 determines the sensing image data of the capacitive touch panel 410 according to the following equation:

$$\text{Csig\_o}(x, y) = \begin{cases} \text{Csig\_1}(x, y), & \text{when } \|\text{Csig\_1}(x, y) - \text{Csig\_b}(x, y)\| \leq \|\text{Csig\_2}(x, y) - \text{Csig\_b}(x, y)\| \\ \text{Csig\_2}(x, y), & \text{when } \|\text{Csig\_1}(x, y) - \text{Csig\_b}(x, y)\| > \|\text{Csig\_2}(x, y) - \text{Csig\_b}(x, y)\|, \end{cases}$$

where Csig_1(x, y) represents one data of the first sensing image data, Csig_2(x, y) represents one data of the second sensing image data, Csig_b(x, y) represents one data of the initialization sensing image data, and Csig_o(x, y) represents the sensing image data of the capacitive touch panel, $0 \leq x \leq M-1$, $0 \leq y \leq N-1$.

In the prior art, the problem in that noises caused by finger touching may be distributed along sensing line direction will be encountered when touch control is actually applied in a capacitive touch panel, and thus there is no solution proposed to solve that problem. The present invention makes use of exchanging the driving device 420 and the sensing device 430 to effectively determine the actual touch position of the touch panel 410, for example position A in FIG. 8, and exclude the erroneous positions, for example positions B and C in FIG. 8.

Without modifying the structure of the touch panel 410, the present invention improves the mutual capacitance (Cm) sensing method, in which sensing lines may be influenced by noise when the touch panel is touched, so as to filter out noises and increase the sensing resolution of the capacitive touch panel by exchanging the driving device and the sensing device.

Although the present invention has been explained in relation to its preferred embodiment, it is to be understood that many other possible modifications and variations can be made without departing from the spirit and scope of the invention as hereinafter claimed.

What is claimed is:

1. A noise reduction system for a capacitive touch panel, the capacitive touch panel including M first conductor lines and N second conductor lines arranged along a first direction and a second direction, respectively, where M and N are integer greater than 1 respectively, the noise reduction system comprising:

a driving device, having a plurality of drivers, for generating touch driving signals in touch sensing operation;

a sensing device, having a plurality of sensors, for detecting whether there is an external object approached according to the touch driving signals, and generating touch sensing signals;

a first switch, connected to the driving device, the sensing device, and the capacitive touch panel, for electrically connecting the plurality of drivers of the driving device and the plurality of sensors of the sensing device to the capacitive touch panel;

a second switch, connected to the driving device, the sensing device, and the capacitive touch panel, for electrically connecting the plurality of drivers of the driving device and the plurality of sensors of the sensing device to the capacitive touch panel; and a controller, connected to the driving device, the sensing device, the first switch, and the second switch, for configuring the first switch and the second switch to perform a first direction driving and second direction sensing, and configuring the first switch and the second switch to perform a second direction driving and first direction sensing, wherein the controller has a register unit including a first storage block, a second storage block and a third storage block, wherein during a first time interval, the controller configures the first switch for electrically connecting the plurality of drivers of the driving device to the M first conductor lines of the capacitive touch panel, and configures the second switch for electrically connecting the plurality of sensors of the sensing device to the N second conductor lines of the capacitive touch panel, thereby proceeding with the first directing driving and second direction sensing and generating a first sensing image data; and wherein during a second time interval, the controller configures the first switch for electrically connecting the plurality of drivers of the driving device to the N second conductor lines of the capacitive touch panel, and configures the second switch for electrically connecting the plurality of sensors of the sensing device to the M first conductor lines of the capacitive touch panel, thereby proceeding with the second direction driving and first direction sensing and generating a second sensing image data.

2. The noise reduction system as claimed in claim 1, wherein the first direction is vertical with the second direction.

3. The noise reduction system as claimed in claim 1, wherein the first storage block stores an initialization sensing image data during the capacitive touch panel initialized, the second storage block stores the first sensing image data during the first time interval, and the third storage block stores the first sensing image data during the second time interval.

4. The noise reduction system as claimed in claim 3, wherein each of the initialization sensing image data, the first sensing image data and the second sensing image data has M×N data respectively.

5. The noise reduction system as claimed in claim 3, wherein the controller determines sensing image data of the capacitive touch panel based on the initialization sensing image data, the first sensing image data and the second sensing image data.

6. The noise reduction system as claimed in claim 5, wherein when an absolute value of difference between the first sensing image data and the initialization sensing image data at corresponding position is smaller than or equal to an absolute value of difference between the second sensing image data at the corresponding position and the initialization sensing image data at the corresponding position, the controller configures the sensing image data at the corresponding position of the capacitive touch panel as the first sensing image data and, otherwise the controller configures the sensing image data at the corresponding position of the capacitive touch panel as the second sensing image data.

7. The noise reduction system as claimed in claim 6, wherein the controller determines the sensing image data of the capacitive touch panel based on the following equation:

$$\text{Csig\_o}(x, y) = \begin{cases} \text{Csig\_1}(x, y), & \text{when } \|\text{Csig\_1}(x, y) - \text{Csig\_b}(x, y)\| \leq \|\text{Csig\_2}(x, y) - \text{Csig\_b}(x, y)\| \\ \text{Csig\_2}(x, y), & \text{when } \|\text{Csig\_1}(x, y) - \text{Csig\_b}(x, y)\| > \|\text{Csig\_2}(x, y) - \text{Csig\_b}(x, y)\|, \end{cases}$$

where $\text{Csig\_1}(x, y)$ represents one data of the first sensing image data, $\text{Csig\_2}(x, y)$ represents one data of the second sensing image data, $\text{Csig\_2}(x, y)$ represents one data of the initialization sensing image data, and $\text{Csig\_o}(x, y)$ represents the sensing image data of the capacitive touch panel, $0 \leq x \leq M-1$, $0 \leq y \leq N-1$.

8. The noise reduction system as claimed in claim 1, wherein the controller performs a transpose operation to the data obtained from proceeding with the second direction driving and first direction sensing during the second time interval, so as to obtain the second sensing image data.

9. A noise reduction method for a capacitive touch panel, the capacitive touch panel having M first conductor lines and N second conductor lines arranged along a first direction and a second direction, respectively, where M and N are each an integer greater than 1, the noise reduction method comprising the steps of:
(A) capturing an initialization sensing image data from the capacitive touch panel;
(B) during a first time interval, a controller configuring a first switch and a second switch to perform a first direction driving and second direction sensing thereby obtaining a first sensing image data, wherein the controller configures the first switch for electrically connecting a plurality of drivers of a driving device to the M first conductor lines from the capacitive touch panel, and configuring the second switch for electrically connecting a plurality of sensors of a sensing device to the N second conductor lines of the capacitive touch panel, so as to perform the first direction driving and second direction sensing;
(C) during a second time interval, the controller configuring the first switch and the second switch to perform a second direction driving and first direction sensing thereby obtaining a second sensing image data; and, wherein the controller configures the first switch for electrically connecting the plurality of drivers of the driving the device to the N second conductor lines from the capacitive touch panel, and configures the second switch for electrically connecting the plurality of sensors of the sensing device to the M first conductor lines from the capacitive touch panel, so as to perform the second direction driving and first direction sensing; and
(D) the controller determining sensing image data from the capacitive touch panel based on the initialization sensing image data, the first sensing image data and the second sensing image data,
wherein, when an absolute value of difference between the first sensing image data and the initialization sensing image data at corresponding point is smaller than or equal to an absolute value of difference between the second sensing image data at the corresponding position and the initialization sensing image data at the corresponding position, the controller configures the sensing image data at corresponding position of the capacitive touch panel as the first sensing image data and, otherwise the controller configures sensing image data at the corresponding position of the capacitive touch panel as the second sensing image data.

10. The noise reduction method as claimed in claim 9, wherein the initialization sensing image data, the first sensing image data and the second sensing image data have M×N data respectively.

11. The noise reduction method as claimed in claim 10, wherein the controller determines the sensing image data of the capacitive touch panel based on the following equation:

$$\text{Csig\_o}(x, y) = \begin{cases} \text{Csig\_1}(x, y), & \text{when } \|\text{Csig\_1}(x, y) - \text{Csig\_b}(x, y)\| \leq \|\text{Csig\_2}(x, y) - \text{Csig\_b}(x, y)\| \\ \text{Csig\_2}(x, y), & \text{when } \|\text{Csig\_1}(x, y) - \text{Csig\_b}(x, y)\| > \|\text{Csig\_2}(x, y) - \text{Csig\_b}(x, y)\|, \end{cases}$$

where $\text{Csig\_1}(x, y)$ represents one data of the first sensing image data, $\text{Csig\_2}(x, y)$ represents one data of the second sensing image data, $\text{Csig\_b}(x, y)$ represents one data of the initialization sensing image data, and $\text{Csig\_o}(x, y)$ represents the sensing image data of the capacitive touch panel, $0 \leq x \leq M-1$, $0 \leq y \leq N-1$.

12. A noise reduction method for a capacitive touch panel, the capacitive touch panel having M first conductor lines and N second conductor lines arranged along a first direction and a second direction, respectively, where M and N are each an integer greater than 1, the noise reduction of method comprising the steps of:

(A) capturing an initialization sensing image data from the capacitive touch panel;
(B) during a first time interval, a controller configuring a first switch and a second switch to perform a first direction driving and second direction sensing thereby obtaining a first sensing image data;
(C) during a second time interval, the controller configuring the first switch and the second switch to perform a second direction driving and first direction sensing thereby obtaining a second sensing image data; and
(D) the controller determining sensing image data from the capacitive touch panel based on the initialization sensing image data, the first sensing image data and the second sensing image data,
wherein the initialization sensing image data, the first sensing image data and the second sensing image data have M×N data respectively;
wherein the controller determines the sensing image data of the capacitive touch panel based on the following equation:

$$Csig\_o(x, y) = \begin{cases} Csig\_1(x, y), & \text{when } \|Csig\_1(x, y) - Csig\_b(x, y)\| \leq \|Csig\_2(x, y) - Csig\_b(x, y)\| \\ Csig\_2(x, y), & \text{when } \|Csig\_1(x, y) - Csig\_b(x, y)\| > \|Csig\_2(x, y) - Csig\_b(x, y)\|, \end{cases}$$

where $Csig\_1(x, y)$ represents one data of the first sensing image data, $Csig\_2(x, y)$ Represents one data of the second sensing image data, $Csig\_b(x, y)$ represents one data of the Initialization sensing image data, and $Csig\_o(x, y)$ represents the sensing image data of the capacitive touch panel, $0 \leq x \leq M-1$, $0 \leq y \leq N-1$.

* * * * *